United States Patent [19]

Fuller

[11] 4,420,196
[45] Dec. 13, 1983

[54] ROTARY FILING DEVICE

[76] Inventor: John M. Fuller, Hawkell House, Fireball Hill, Sunningdale, Berkshire, England

[21] Appl. No.: 272,931

[22] Filed: Jun. 12, 1981

[51] Int. Cl.³ .................... A47B 63/00; A47B 81/06
[52] U.S. Cl. ................................ 312/186; 312/11; 312/13; 312/14; 206/387
[58] Field of Search ............... 312/11, 13, 14, 186, 312/134, 125; 206/387

[56] References Cited

U.S. PATENT DOCUMENTS

| | | | |
|---|---|---|---|
| 295,391 | 3/1884 | Havens | 312/186 |
| 2,931,686 | 4/1960 | Afdal | 312/245 |
| 3,265,453 | 8/1966 | Seide | 312/13 |
| 3,777,895 | 12/1973 | Weinstein et al. | 312/11 |
| 3,786,927 | 1/1974 | Manheim | 312/14 |
| 3,811,745 | 5/1974 | Cylke | 312/13 |
| 4,160,570 | 7/1979 | Bridges | 312/245 |
| 4,317,603 | 3/1982 | Pepicelli et al. | 312/13 |
| 4,330,161 | 5/1982 | Khawand | 312/13 |

FOREIGN PATENT DOCUMENTS

| | | | |
|---|---|---|---|
| 958689 | 5/1964 | United Kingdom | 312/13 |
| 426880 | 1/1975 | U.S.S.R. | 312/186 |

Primary Examiner—Victor N. Sakran
Attorney, Agent, or Firm—Woodard, Weikart, Emhardt & Naughton

[57] ABSTRACT

A rotary filing device wherein mounting strips adapted to receive a container for an item or items to be stored are linked together in an endless chain and supported at each end in common recesses in a frame such that the chain is movable by tilting successive strips to provide access to each container in turn. The frame carries projections which are adapted to interlock with projections on an identical element or on a mounting bracket whereby a plurality of devices can be secured together and/or to a support. When the container is a tape cassette library case, the mounting strip may additionally be adapted to both the cassette case and the cassette itself, as desired. A spring loaded catch fitted in the recess to bear upon the ends of the mounting strips received therein, enables positive indexing and automatic resumption of a tidy equilibrium position, irrespective of the orientation of the device, in use.

10 Claims, 6 Drawing Figures

ROTARY FILING DEVICE

This invention relates to a rotary filing device.

It is often required to store a collection of items in such a way as to afford ready access to a selected item or group of items. Examples of such items are tape cassettes, tools such as drill bits or Allen keys which are often grouped in ranges of sizes, sets of fishing flies of different types or collections of photographs or slides.

According to this invention I propose a rotary filing device comprising a frame carrying mounting strips or slats each adapted to receive a container for items to be stored, all of the strips being freely supported at each end in a common elongate recess in the frame and the strips themselves being linked together to form an endless chain which is movable by tilting successive strips to provide access to each container in turn.

The containers may be of any kind but preferably are boxes, possibly with a hinged or removable lid, and may be suitable for storing either single items, one example of such containers being cassette library cases, or groups of items such as sets of drills, allen keys, photographs, fishing flies or whatever, so that the groups of items can be removed separately from the filing device and carried or otherwise handled conveniently, within their container.

When the rotary filing device is intended for the storage of tape cassettes, whether they be video or audio cassettes, the mounting strips or slats are preferably each adapted to receive either a cassette library case or the cassette itself so that the user may choose whether to store cassettes with or without library cases.

The rotary filing device may be disposed such that the endless chain of mounting strips or slats, and the elongate recesses in which the ends of the strips or slats are received, are horizontal and, indeed this is preferred for most applications, but it may be required when for example storing elongate items such as drill bits, or for reasons of preference, to arrange the rotary filing device such that the mounting strips are vertical. In one embodiment wherein the ends of the interlinked mounted strips are freely received within the recess, positive indexing and automatic return to a stable and tidy equilibrium position will occur due to the effect of gravity only when the interlinked mounting strips are disposed horizontally. To improve control of the indexing movement and to ensure that the strips and hence also the containers mounted thereon, resume the desirable tidy stable equilibrium position irrespective of the orientation of the device, a catch may be fitted in at least one, and preferably of the recesses, the catch comprising a catch member bearing on mounting strip ends received within the recess and biased so as to urge the strips to resume a position in which the interlinked strips are disposed in two parallel rows.

The frame may be a cabinet open at one end to provide access to cassettes or cassette cases mounted on the interlinked strips, and, further may carry on one face projections which are complementary with projections on an opposite face whereby two identical devices can be attached together by interlocking the projections on the said one face of one device with the complementary projections on the said opposite face of the other device. To permit mounting of the device on a support, a bracket may be provided for attachment to the support and carrying projections complementary with the projections on one face of the frame.

The strips may be connected together by means of a series of interlocking projections and recesses forming a hinge between adjacent strips but in a preferred embodiment the strips are attached to an endless belt of flexible material with the edges of adjacent strips in abutment and disposed normal to the axis of the belt.

Embodiments of the invention will now be described by way of example, with reference to the accompanying drawings of which:

Figure 1:
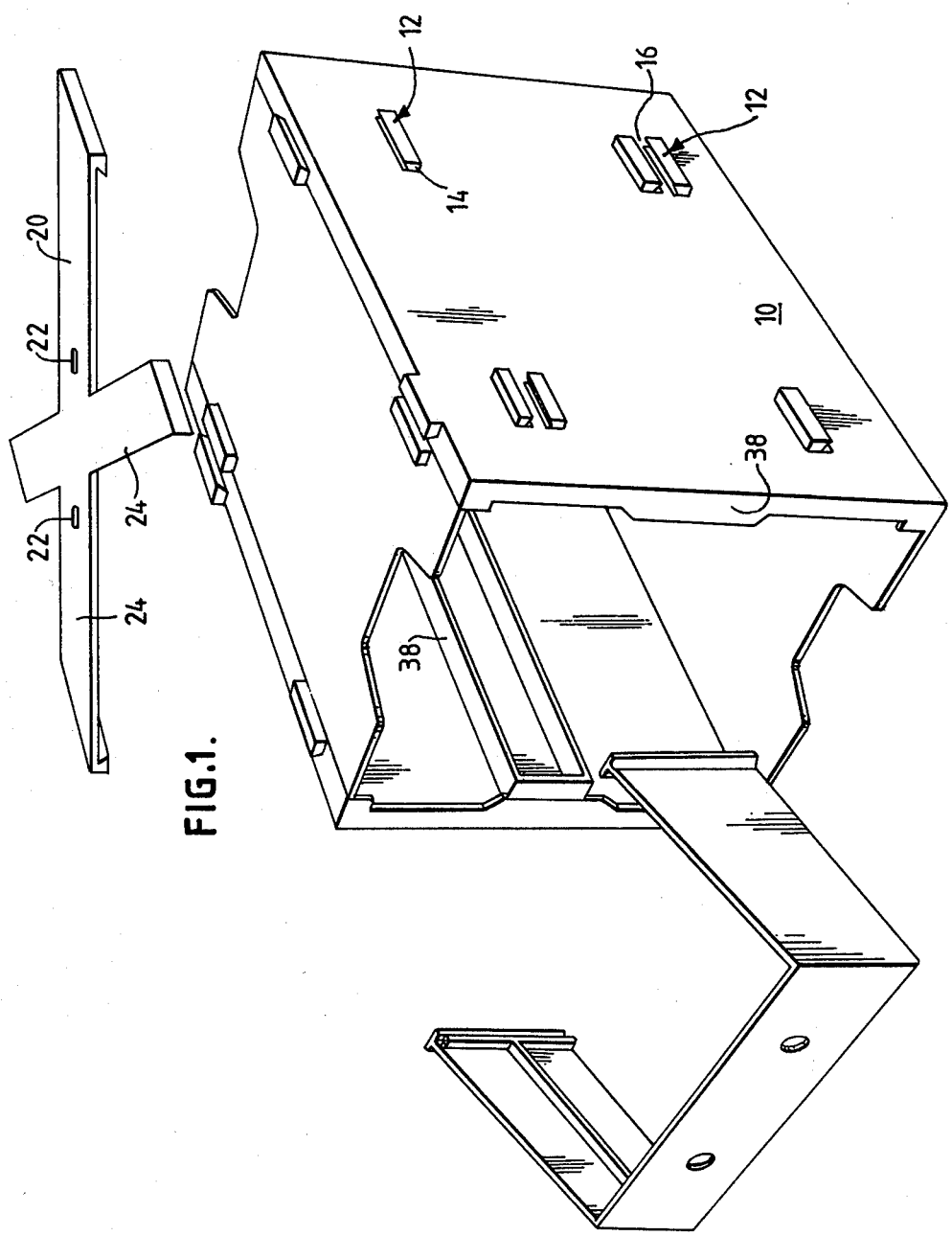
FIG. 1 is a perspective view, partly exploded, of a rotary filing cabinet for storing tape cassettes, the cabinet being adapted for attachment to other similar cabinets to build a modular storage system.

The cabinet 10 shown in FIG. 1 is adapted by means of projections 12 defining complementary tongues 14 and grooves 16, preferably dovetail or half-dovetail tongues and grooves, to interlock with similar cabinets (not shown) to build a modular storage system. There are projections on each face so enabling attachment of up to four adjacent cabinets. If desired the cabinet can be suspended from a wall or the underside of a shelf by means of a cruciform bracket 20 for attachment to the wall or shelf by screws or the like, passing through holes 22. At the ends of each are 24 of the cruciform bracket are projections adapted to engage the projections 16 on the upper face of the cabinet. Access to the interior of the cabinet is from either end.

Figure 2:
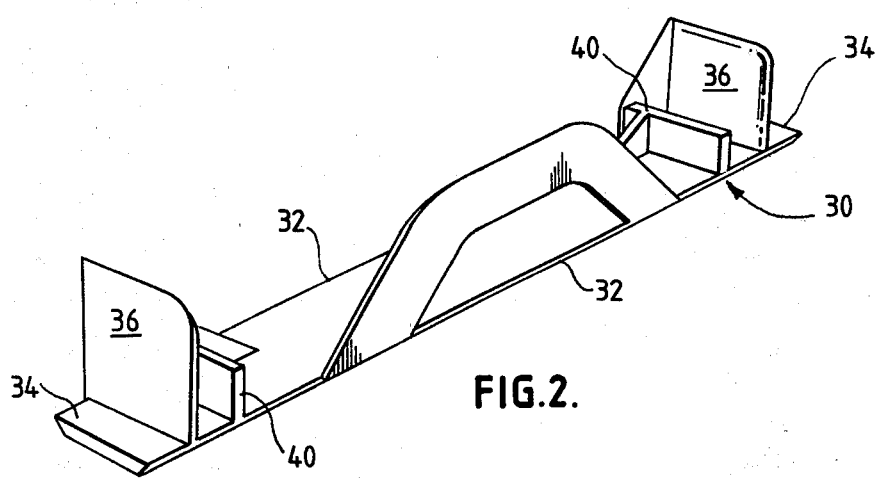
FIG. 2, shows a cassette or cassette library case mounting strip for attachment to a flexible belt, which fits within the cabinet of FIG. 1.

Cassette mounting strips 30 such as shown in FIG. 2 are fixed by adhesive to an endless flexible belt 31 (see FIG. 3), such that the elongate edges 32 of adjacent strips are in abutment and lie normal to the longitudinal axis of the belt. Ends 34 of the mounting strips projecting beyond wings 36, are received in opposed rectangular recesses 38 (not shown) formed in the side walls of the cabinet 10.

The spacing between the wings 36 on each mounting strip is such that a cassette case is a press-fit therebetween but the strips 30 also have means 40 for mounting the cassettes without cases.

Figure 3:
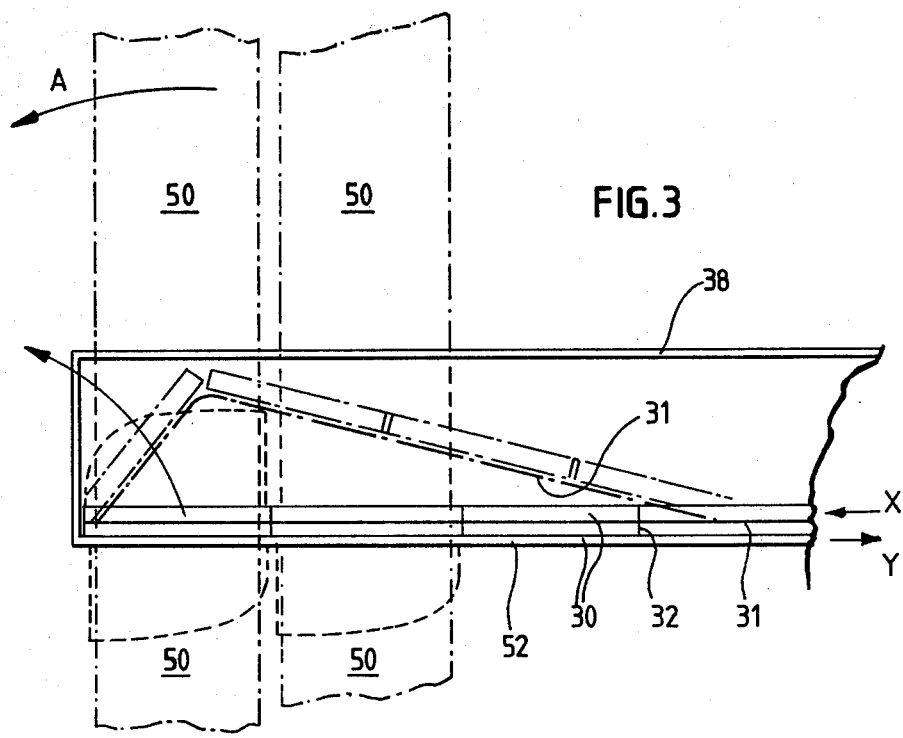
FIG. 3 illustrates the manner in which the rotary file operates affording access to each in turn of the stored tape cassettes.

Referring now to FIG. 3, cassettes or cassette cases 50 mounted upon the strips 30 connected to the continuous endless belt 31 and resting on the lower edge 52 of the rectangular recesses 38, lie in a vertical plane, some depending from strips 30 on the lower run of the endless belt and others standing vertically on strips 20 in the upper run. In this state, only those cassettes at the ends of the cabinet are visible. To gain access to other cassettes, the leading cassette in the upper run is tilted as indicated by arrow A so that the mounting strip 30 to which it is secured, pivots about its leading edge and is lifted to the position shown by the dot-dash lines. Further, tilting causes that strip to turn over, drawing with it the strips in the upper run and displacing the strips in the lower run as indicated by the arrows X and Y, that cassette, then entering the lower runs. This procedure may be repeated at will and, if desired, in the opposite direction until a particular cassette is located.

By virtue of the fact that the strips are linked together in an endless chain and the effects of gravity, the device exhibits a positive indexing motion making the device easy to use, and there is a strong tendency for the cassettes to return to a tidy stable equilibrium position corresponding to the position of the mounting strips shown in solid lines in FIG. 3, irrespective of their initial position when released by the user. For this same reason there is also a positive indexing motion which makes the filing device easy to use.

Figure 4:
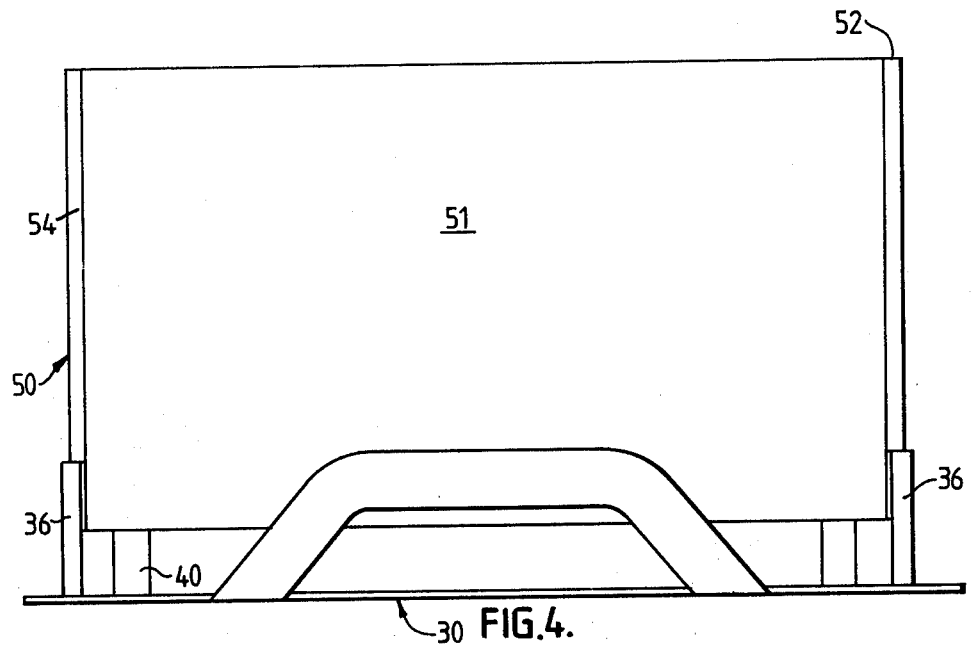
FIG. 4 shows a modified mounting strip which permits opening of a cassette library case or the like received thereby, without removing the case from the rotary file.

With reference to FIG. 4, a conventional cassette library case 50 has a flat lid 51 which is hinged to the body 52 of the case and, in the closed position fits snugly between side walls 54 of the case. In order to permit a library case to be opened without removing the case from the rotary file, a modified mounting strip such as shown in FIG. 4, may be used. Unlike the strip shown in FIG. 2, the wings 36 extend parallel to the longitudinal edge 32 of the strip, only for a short distance less than the wall thickness 54 of the cassette case. This allows the lid 51 to move relative to the case while seated on the mounting strip.

The embodiments of FIGS. 1 to 4 are described with reference to the storage of tape cassettes and, in particular, tape cassettes within library cases, but it will be appreciated that the rotary filing device according to this invention may be adapted, without departing from the scope of the invention, for use with a wide variety of storage containers for many different purposes.

As mentioned above it may be convenient to use the rotary filing device with the mounting strips 30 extending vertically, simply by turning the cabinet through 90° from the position shown in FIG. 1. In this position, the mounting strips are supported on one end thereof and although retained substantially vertical by engagement with the walls of the recess, the advantageous gravitational effects referred to above no longer apply with the result that the cassette cases 50, or in general, the containers, are more freely movable to the extent that the positive indexing motion is lost and will remain in the position in which they are left after use.

Figure 5:
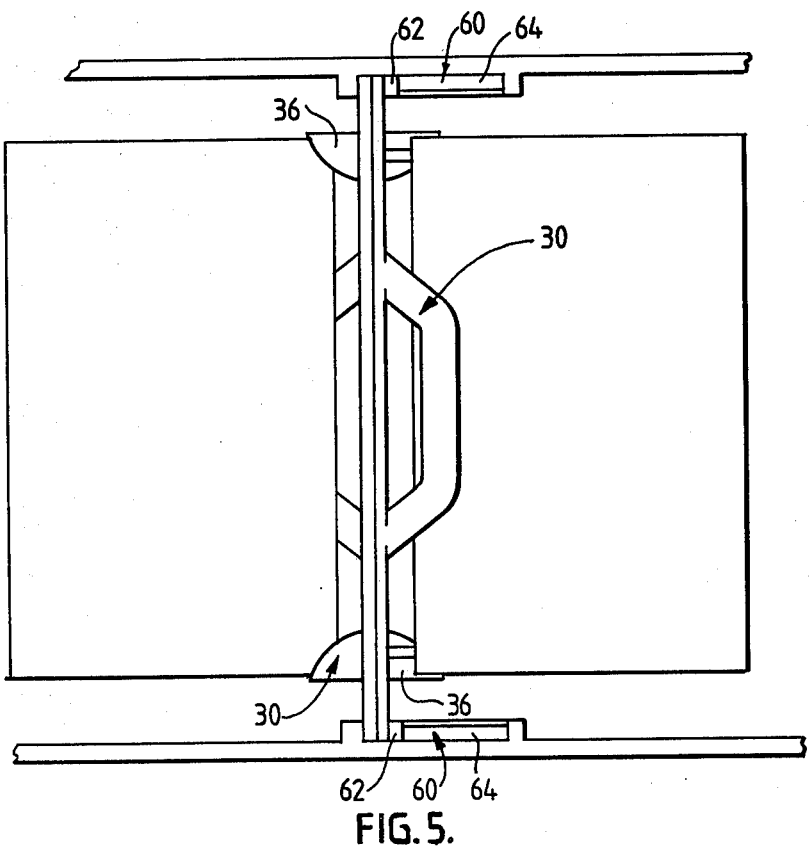
FIG. 5 is a cross-section of a modified embodiment especially suited for applications in which the device is used when disposed in an orientation displaced by 90° relative to the orientation of the device of FIGS. 1 to 3.
Figure 6:
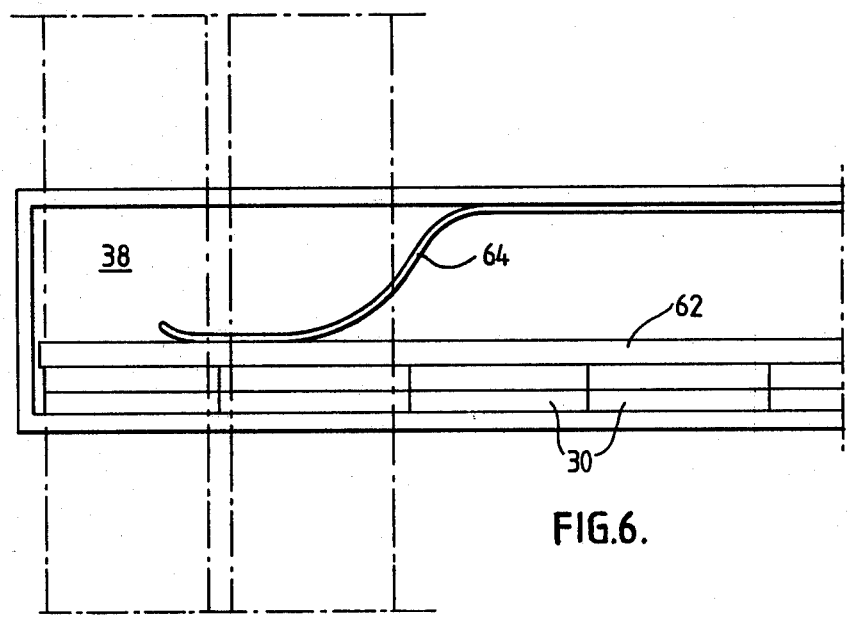
FIG. 6 is a view similar to that of FIG. 3 but showing details of the embodiment of FIG. 5.

Control of the movement of the endless chain of mounting strips is considerably improved by inserting in each of the recesses a spring loaded catch which bears on the ends of the strips, as in the embodiment of FIGS. 5 and 6. The catch 60 constitutes an elongate member 62 extending along the entire length of the recess 38 and biased away from one side wall thereof by a leaf spring 64, the ends of the mounting strips being trapped between the member 62 and the opposite side wall of the recess. As the containers mounted on the strips are tilted when searching through the rotary file, the spring is compressed but on release the mounting strips will snap into the stable position illustrated in the Figures.

With a spring-loaded catch as described above the rotary filing device exhibits the desirable positive indexing motion and return to the tidy stable equilibrium position, irrespective of the orientation of the cabinet in use.

I claim:

1. A rotary filing device comprising a frame carrying mounting strips each adapted to receive a container for an item or items to be stored, all of the strips being supported at each end in a common elongate recess and the strips themselves being linked together to form an endless chain which is movable within said recess by tilting successive strips to provide access to each container in turn.

2. A device according to claim 1 wherein the strips are attached to an endless belt of flexible material with the edges of adjacent strips in abutment and disposed normal to the axis of the belt.

3. A device according to claim 2, wherein the frame comprises a cabinet open at one end to provide access to containers mounted on the interlinked strips.

4. A device according to claim 3 wherein each mounting strip has projecting wings which are spaced apart such that a container for an item or items to be stored, is a press-fit therebetween whereby the container is removably received by the strip.

5. A device according to claim 4 wherein the storage containers have hinged or removable lids, the said wings being so adapted or arranged as to leave opening of the lids unobstructed.

6. A rotary filing device comprising a frame carrying mounting strips each adapted to receive a container for an item or items to be stored, all of the strips being supported at each end in a common elongate recess and the strips themselves being linked together to form an endless chain which is movable by tilting successive strips to provide access to each container in turn; and
 a catch in at least one of the said recesses, comprising
  a catch member bearing on mounting strip ends received within the recess and biased so as to urge the strips to resume a position in which the interlinked strips are disposed in two parallel rows.

7. A device according to claim 6 wherein the catch member is an elongate strip extending along the length of the recess and is biased by a leaf spring away from one side of the recess to trap the ends of the mounting strips against the other side of the recess.

8. A device according to claim 7 wherein the frame carries on one face projections which are complementary with projections on an opposite face whereby two identical devices can be attached together by interlocking the projections on the said one face of one device with the complementary projections on the said opposite face of the other device.

9. A device according to claim 8 and comprising a bracket for attachment to a support and carrying projections complementary with the projections on one face of the frame such that by interlocking the complementary projections the frame can be mounted on the support.

10. A device according to claim 9 wherein each mounting strip is adapted to receive both a cassette and a cassette case as desired.

* * * * *